United States Patent [19]

Bauer

[11] 4,320,942

[45] Mar. 23, 1982

[54] POSITION COMPENSATION MECHANISM FOR A MOVIE CAMERA

[76] Inventor: Fritz Bauer, Loquaiplatz 13/26, A-1010 Vienna, Austria

[21] Appl. No.: 197,000

[22] Filed: Oct. 14, 1980

[30] Foreign Application Priority Data

Mar. 1, 1980 [AT] Austria ..................................... 29/80

[51] Int. Cl.³ ............................................ G03B 17/02
[52] U.S. Cl. ..................................... 352/242; 352/140
[58] Field of Search ................. 352/35, 242, 139, 140

[56] References Cited

U.S. PATENT DOCUMENTS

| | | | |
|---|---|---|---|
| 3,331,653 | 7/1967 | Blaschek et al. | 352/242 |
| 3,538,830 | 11/1970 | Hendriksen et al. | 352/140 |
| 3,538,833 | 11/1970 | Koeber | 352/140 |
| 3,550,517 | 12/1970 | Mueller | 352/139 |
| 3,563,151 | 2/1971 | Koeber | 352/140 |
| 3,675,559 | 7/1972 | Freeland | 352/140 |
| 4,121,886 | 10/1978 | Gottschalk | 352/35 |

FOREIGN PATENT DOCUMENTS

1150504  4/1969  United Kingdom .................. 352/35

*Primary Examiner*—Monroe H. Hayes
*Attorney, Agent, or Firm*—Blum, Kaplan, Friedman, Silberman & Beran

[57] ABSTRACT

A position compensation mechanism for maintaining a movie camera in focus upon displacement. An inner housing supporting a film gate is resiliently mounted at a predetermined orientation within an outer housing which supports the photographic optics of the movie camera. A position compensator is coupled intermediate the inner and outer housing for maintaining the inner housing at its predetermined orientation with respect to the outer housing when the outer housing is displaced.

18 Claims, 5 Drawing Figures

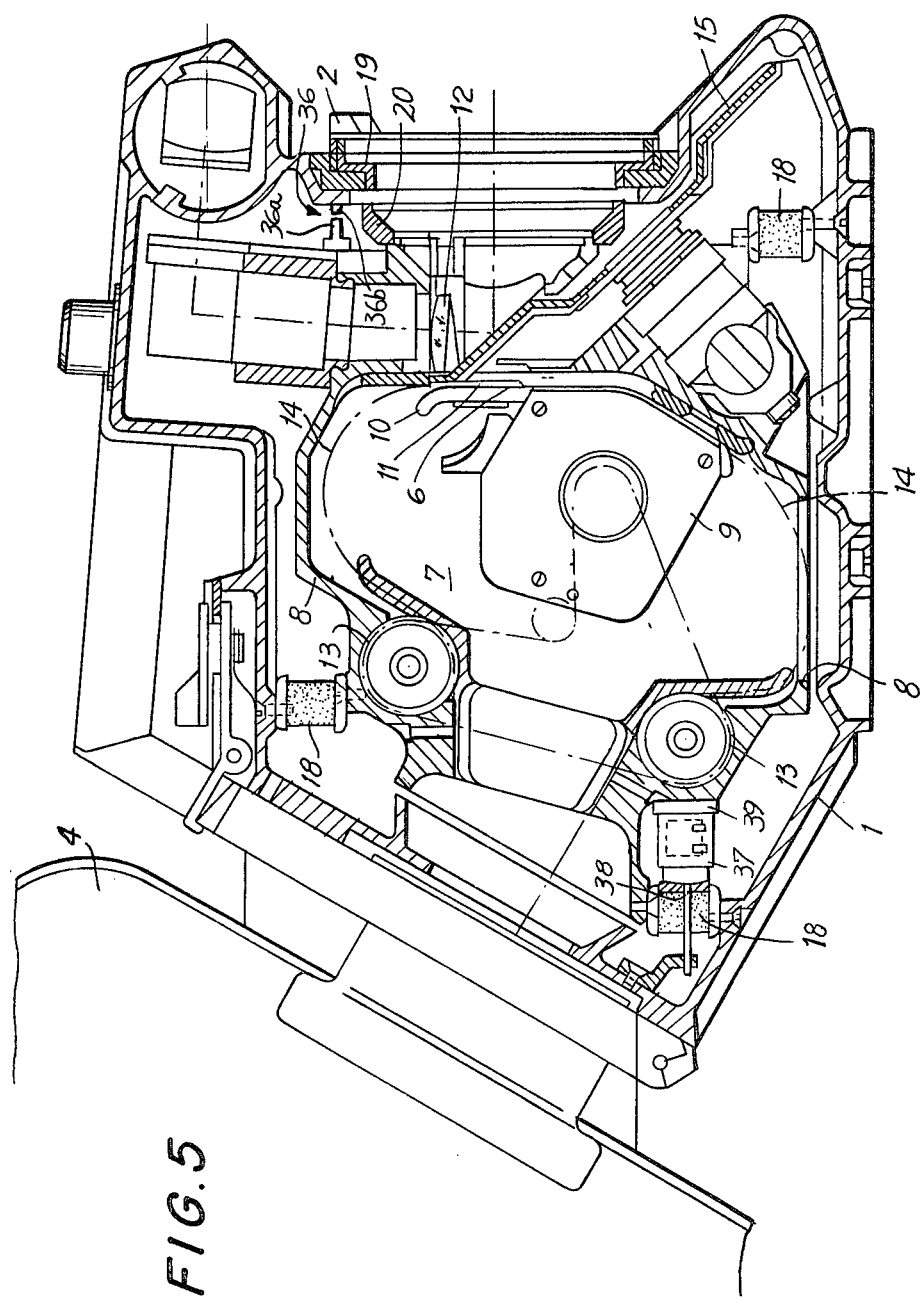

POSITION COMPENSATION MECHANISM FOR A MOVIE CAMERA

BACKGROUND OF THE INVENTION

This invention is directed to a position compensation mechanism for a movie camera having inner and outer housings and, in particular, to a position compensation mechanism that maintains the orientation of the film gate positioned on the inner housing, with respect to the camera optic on the outer housing when the movie camera is displaced.

A variety of motion picture cameras of the professional type are presently available. One type of movie camera includes an inner housing which supports a film transport mechanism for moving the film and a film gate and shutter for exposing consecutive frames of the film so that the film is exposed to light. The inner camera housing is generally mounted in an outer camera housing which is adapted to support the photographic optics (lenses) of the camera. The photographic optics are adjustable with respect to the film gate and shutter so that proper focusing can be made. However, where the motion picture camera is adapted to record sound as well as visual scenes, it is preferable for the inner housing to be properly mounted within the outer housing so that sounds are not transmitted from the inner housing to the outer housing.

Accordingly, mountings have been developed which substantially dampen sounds created by the internal mechanism to the outer housing. One such type of mounting is disclosed in applicant's co-pending U.S. patent application Ser. No. 174,063 entitled Adjustable Mountings for A Movie Camera, filed July 30, 1980 which is hereby incorporated by reference as if fully set forth herein. Such sound damping mountings are generally resilient in nature so that when the camera is tilted or displaced for properly filming the desired scenes, the inner housing will be displaced with respect to the outer housing. Hence, the film gate and shutter, which are mounted on the inner housing, will also be displaced relative to the photographic optics (lenses) of the movie camera and the camera will move out of focus. The positioning of the film gate with respect to the photographic optics and the distance of the film gate and shutter to the supporting surface of the photographic optics define a predetermined orientation when the focusing of the camera is optimized. However, this orientation will be changed whenever the camera is tilted, thereby impairing the picture definition or focusing. The problem is particularly acute in vertical tilting of the motion picture camera. Specifically, the focal plane distance, namely the distance from the support surface of the photograph optics to the plane defined by the film passing through the film gate, is a factor that is most significant in obtaining optimum focusing of the lens.

As disclosed in applicant's co-pending U.S. patent application, Ser. No. 174,063, the mountings which support the inner housing on the outer housing are adjustable to allow for proper positioning. However, continuous manual adjustment of the lenses or mountings would be required to keep the camera in focus for filming a scene wherein the camera is to be selectively repositioned. Accordingly, a position compensation mechanism coupled intermediate the inner housing and the outer housing which will substantially maintain the position of the inner housing with respect to the outer housing so that the film gate maintains its orientation with respect to the camera optics is desired.

SUMMARY OF THE INVENTION

Generally speaking, in accordance with the instant invention, a position compensation mechanism for maintaining the orientation of an inner camera housing with respect to an outer camera housing is provided. Specifically, an inner housing including a film transport mechanism and a film gate and shutter is resiliently supported within an outer housing. The outer housing supports the photographic optics (lenses) of the movie camera. A position compensation mechanism is coupled intermediate the inner and outer housings so that upon displacement of the movie camera and the consequent change in the center of gravity of the inner housing, the position compensation mechanism will automatically maintain the orientation of the inner housing with respect to the outer housing.

Accordingly, it is an object of the instant invention to provide a position compensation mechanism for a movie camera.

Another object of the instant invention is to provide a position compensation mechanism for a movie camera for automatically maintaining the orientation of the inner camera housing with respect to the outer camera housing.

A further object of the instant invention is to provide a position compensation mechanism for a movie camera which will improve focusing of the camera optics when the movie camera is tilted, turned or displaced.

A still further object of the instant invention is to provide a position compensation mechanism for a movie camera that substantially maintains the focal plane distance when the camera is tilted, turned or displaced.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a sectional view of the instant invention taken along line V—V of FIG. 1.

DESCRIPTION OF THE PREFERRED EMBODIMENTS

Figure 1:
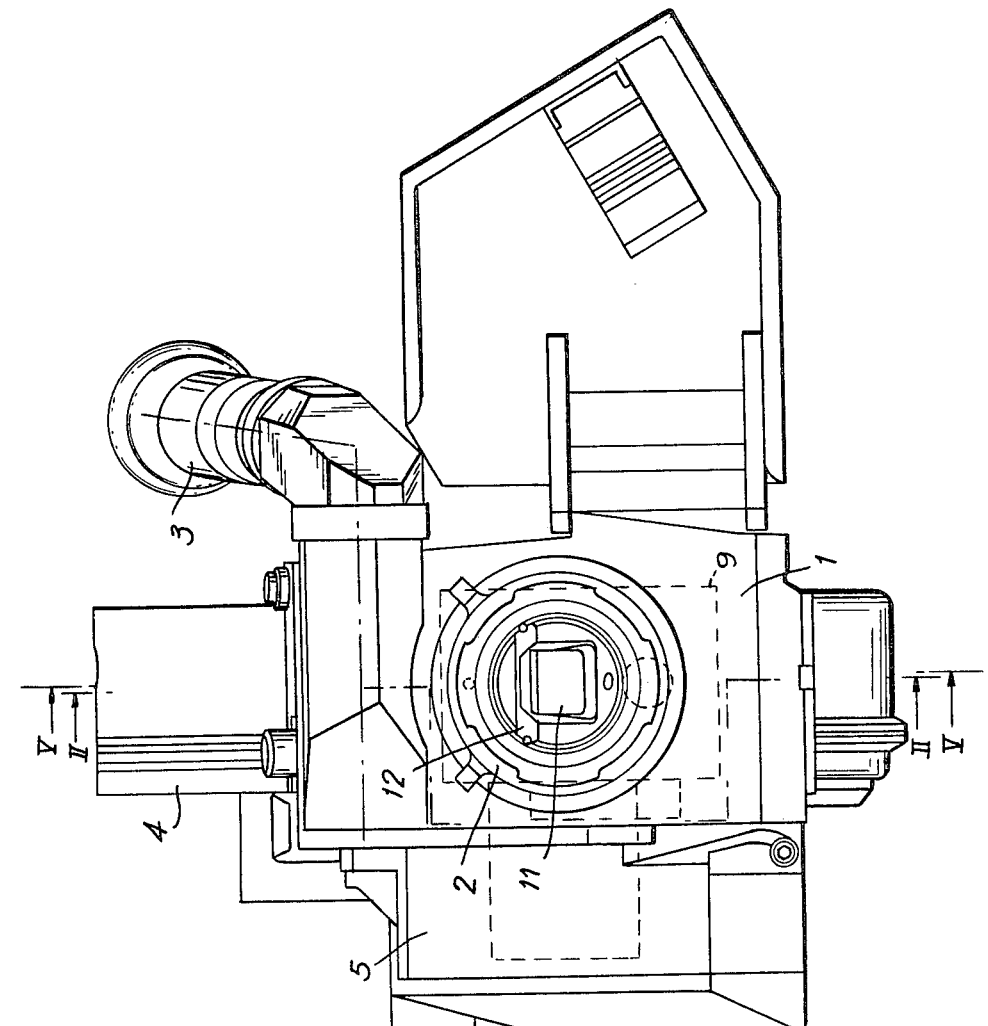
FIG. 1 is an elevational view of a movie camera having a position compensation mechanism in accordance with the instant invention.
Figure 2:
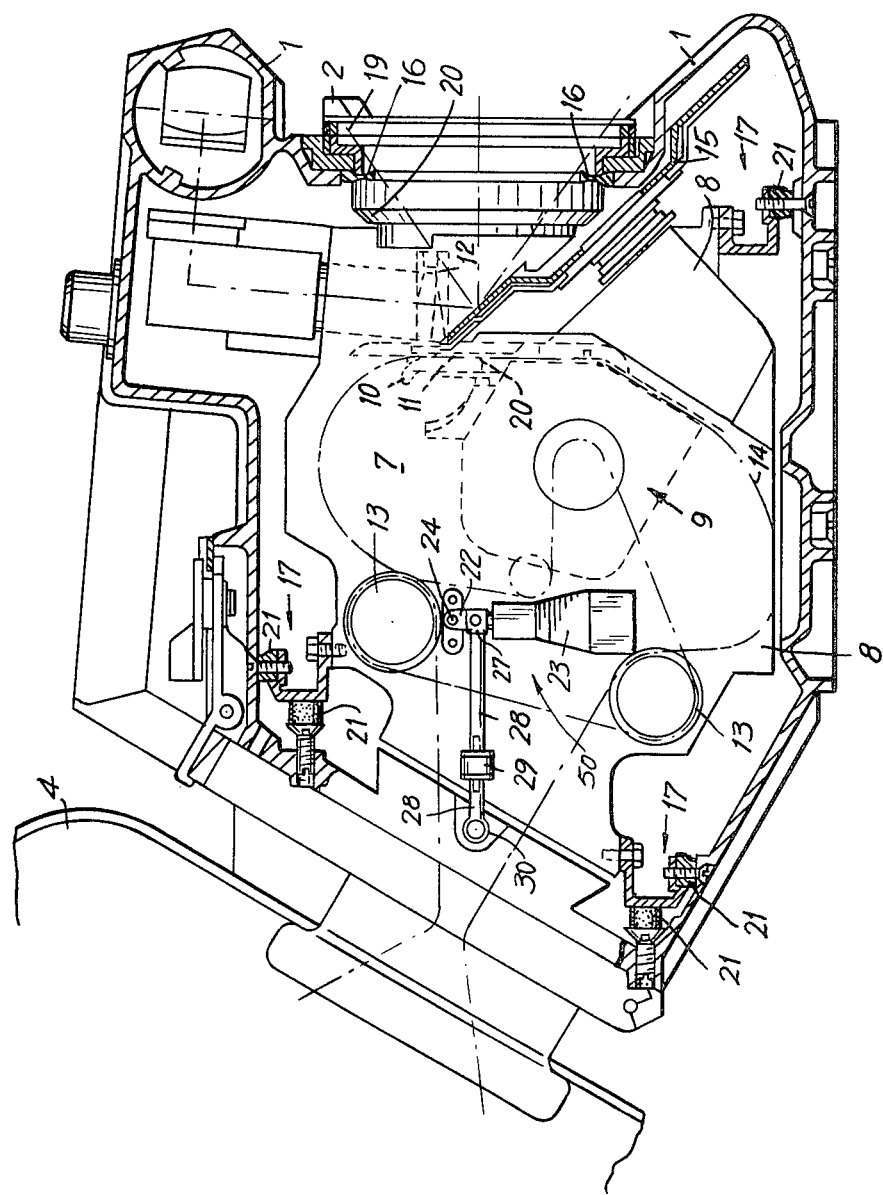
FIG. 2 is a sectional view taken along lines II—II of FIG. 1.

Reference is first made to FIGS. 1 and 2 of the drawings, wherein an outer camera housing 1, having the photographic optics (lenses) removed therefrom is depicted. The housing 1 includes a lens mounting 2 for permitting interchangeable photographic optics to be utilized with the movie camera. The outer housing 1 further supports a view finder eye piece 3 and a film magazine 4. Film magazine 4 includes a film unwinding spool (not shown) for delivering film to the camera and a film winding spool (not shown) for returning the film to film magazine 4. The outer camera housing 1 further includes a camera door 5, which is open as illustrated in FIG. 1, camera door 5 allowing access to inner camera 7. Inner camera 7 includes an inner housing 8 for supporting the following components: A film transport mechanism, generally indicated as 9; a film guide plate 10; a film gate 11; a ground glass plate 12; film 14 (illustrated by broken lines); a rotating assembly 13 for transporting film 14; a rotating mirror shutter, generally indicated as 15; and a motor and transmission assembly (not shown) for driving film transport mechanism 9 and rotating mirror shutter 15. Each of the above components is conventionally found in a movie camera.

As depicted in FIG. 2 inner housing 8 and each of the camera components supported thereby and mounted within the outer housing 1 by resilient mounting elements, generally indicated as 16 and 17, which act to provide isolation between the inner housing and the outer housing in order to reduce or dampen the communication of sound from the inner housing to the outer housing. Resilient mounting ring 16 is located intermediate the inner side of lens mounting 2 and an adapter ring 20 of inner housing 8. Three resilient mounting elements 17 include resilient support elements 21. Resilient mounting ring 16 and resileint mounting elements 17 are generally formed from an elastically yieldable material, such as plastic, rubber or the like and the contractions thereof are described in detail in applicant's co-pending application Ser. No. 174,063.

Referring now to FIG. 5, alternative resilient mounting elements for resiliently supporting inner camera housing 8 within outer camera housing 1 are depicted. The resilient mounting elements depicted in FIG. 5 include solid elements 18 constructed of an elastic material such as plastic, rubber or the like. It is noted that as depicted in FIG. 5, there is no coupling between the front side of inner camera 7 and the front side of the outer camera housing 1 as is provided by support elements 16 illustrated in FIG. 2.

When a movie camera of the type described above is tilted, the center of gravity of the inner camera 7 is shifted, thereby resulting in a redistribution of the support forces acting on the elastic support elements as distinguished from the support forces acting on these elements when the camera is in a horizontal position. The elastic support elements are, accordingly, subjected to different stresses and the inner camera 7 will slightly shift relative to outer camera housing 1. This shifting not only alters the distance of the plane 6 defined by film 14 relative to bearing surface 19 of lens 2, but also the position of film gate 11 relative to the optical axis of the photographic optics (lenses). Since these orientations are decisive in obtaining optimum picture definition (focusing) of the movie camera, the camera will go out of focus, even if minimally, when the movie camera is tilted.

Figure 3:
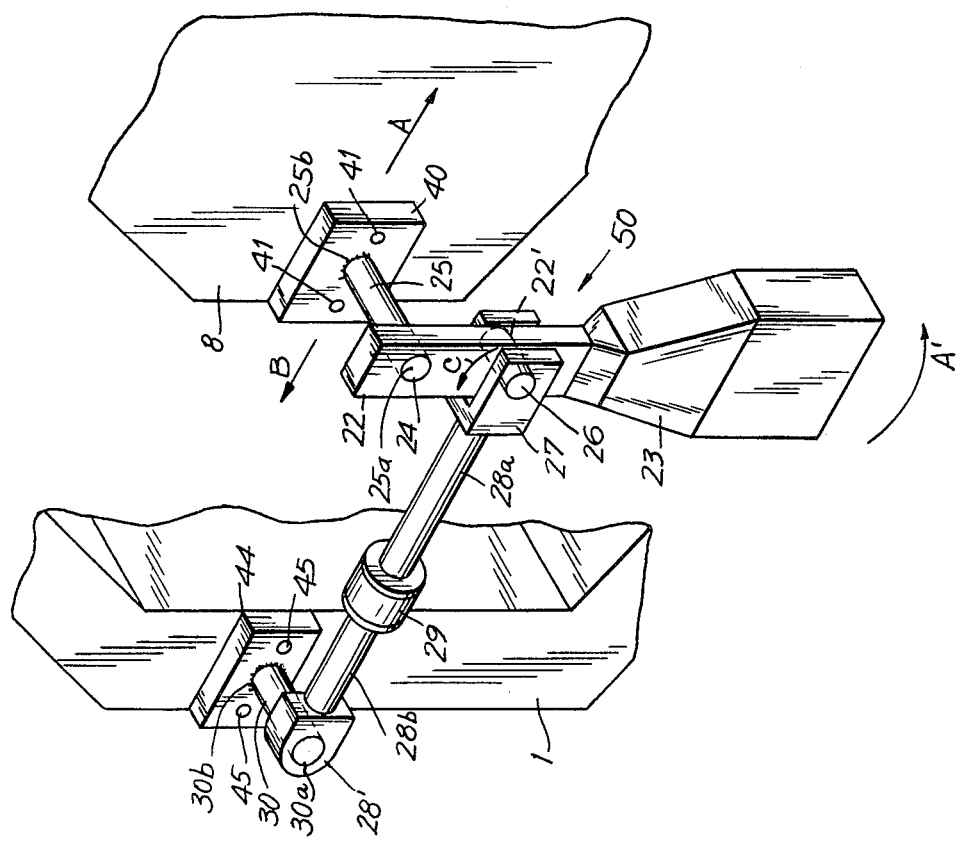
FIG. 3 is a perspective view of a first embodiment of the position compensation mechanism of the instant invention.

In order to correct the position changes of the inner camera 7 with respect to outer housing 1 when the movie camera is tilted and the consequent unfocusing of the movie camera, a counterbalance position compensation mechanism, generally indicated as 50, is provided. Referring first to FIGS. 2 and 3, the construction and operation of position compensation mechanism 50 will be described in detail. Position compensation mechanism 50 includes a two-armed lever 22 which generally lies in a vertical plane of the camera. Two-armed lever 22 includes as a first arm, a downward hanging solid body or weight 23. Second arm 43 of lever 22 is rotatably connected to an axle stump 25. A first end 25a of axle 25 is rotatably secured in opening 24 of lever 22. The other end 25b of axle 25 is fixedly secured to a mounting member 40, which mounting member 40 is secured to inner housing 8 by means of screws 41.

A fork-shaped rod 28 includes a first end 28' which is rotatably secured to first end 30a of distance spacer 30. The other end 30b of spacer 30 is fixedly secured to a mounting bracket 44 which, in turn, in secured to outer housing 1 by means of screws 45. A fulcrum pin 22' of lever 22 is rotatably positioned in fork-shaped end 27 of connecting rod 28 by means of shaft 26 so that lever 22 is pivotably coupled to fork-shaped end 27 by fulcrum pin 22'.

It is noted that forked-shaped rod 28 includes two portions 28a and 28b which are coupled together through an intermediate resilient layer 29 of elastic material such as plastic, rubber or the like. Layer 29 provides proper damping between outer housing 1 and inner housing 8. Accordingly, inner housing 8 remains completely supported in outer housing 1 by resilient members 16, 21 and 29.

The operation of position compensation mechanism 50 will now be explained with reference to FIG. 3. If the motion picture camera is tilted so that inner camera housing 8 is displaced in the direction of arrow A due to the resiliencey of resilient members 16, 21 and 29, lever 22 will be caused to pivot about its fulcrum 22' (arrow C) in the direction of arrow A' due to the gravitational forces acting on solid body 23. Accordingly, since solid body 23 will move in the direction of arrow A', the other end 43 of lever 22 will move in the direction of arrow B. Since axle 25 couples end 43 to inner housing 8, inner housing 8 will be shifted in the direction of arrow B and will return substantially to its undisplaced position relative to outer housing 1. It is noted that as lever 22 pivots about its fulcrum pin 22', it will cause tortional forces on both axle 25 and rod 28. Accordingly, axle 25 is rotatably mounted to end 43 of lever 22 and rod 28 is rotatably mounted to spacer 30, as described above, to properly compensate for these tortional forces so that lever 22 can freely pivot. Since inner housing 8 is returned to its original position, film gate 8 and shutter 15 supported on the inner housing will be maintained in their initial orientation. Unless the initial orientation between the inner housing and outer housing are maintained the optimum focus of the camera is difficult to maintain.

Figure 4:
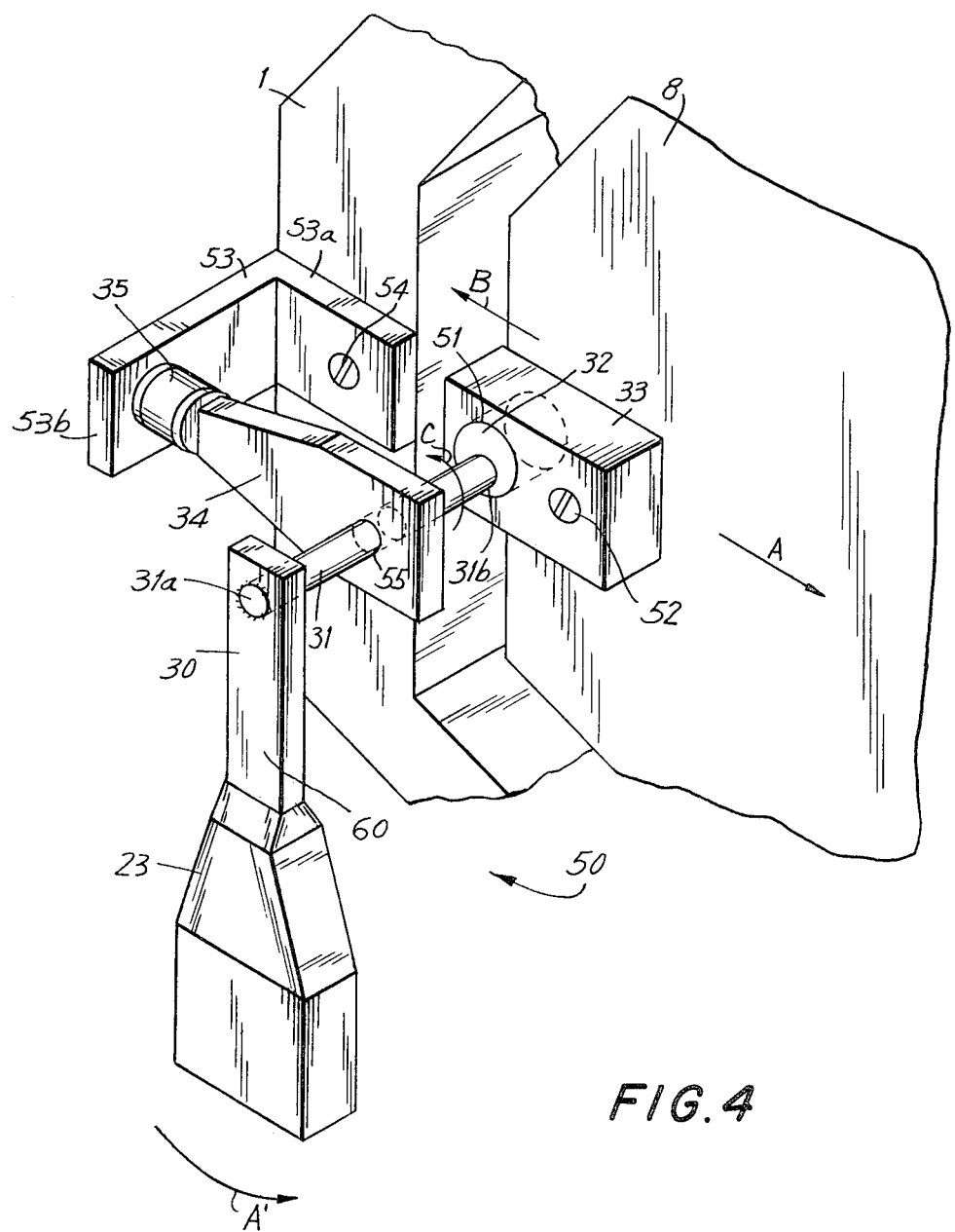
FIG. 4 is a perspective view of position compensation mechanism constructed in accordance with an alternative embodiment of the instant invention.

Referring now to FIG. 4, an alternative embodiment of position compensation mechanism 50 is depicted. Position compensation mechanism 50 includes a one armed lever 60 oriented in a vertical plane of the movie camera. A first end of lever 60 includes a solid body or weight 23. The other end is fixed to a first end 31a of shaft 31. The other end 31b of shaft 31 is coupled to an eccentric disc 32. Eccentric disc 32 is rotatably positioned within a larger eccentric opening 51 in mounting block 33. Mounting block 33 is secured to inner camera housing 8 by means of a screw 52.

A first leg 53a of L-shaped connecting bracket 53 is mounted to outer housing 1 by a screw 54. A second leg 53b of bracket 53 supports a flange member 34, which member is resiliently coupled to leg 53b by means of intermediate resilient layer 35, formed of elastic material such as plastic, rubber or the like. Resilient layer 35 provides a resilient coupling between outer housing 1 and inner housing 8 and provides a proper damping between the inner and outer housings. Flange 34 includes an opening 55 through which shaft 31 rotatably passes for supporting shaft 31 and, hence, lever 60.

The operation of the position compensation mechanism depicted in FIG. 4 will now be explained. Should the movie camera be tilted so that inner housing 8 is displaced in the direction of arrow A, due to the resiliency of the mounting elements, the gravitational force acting on weight 23 will cause lever 60 to swing in the direction of arrow A'. Since shaft 31 is fixedly secured to lever 36, the torque exerted on shaft 31 by the displacement of weight 23 will cause shaft 31 to rotate in the direction of arrow C (counterclockwise in FIG. 4). Accordingly, eccentric disc 32 secured to shaft 31 will rotate in the direction of arrow C. Due to the larger eccentric hole 51 in which eccentric disc 32 is situated, inner housing 8 will be caused to move in the direction of arrow B. Inner housing 8 will therefore be maintained at its initial position by the displacement of mounting block 33, thereby compensating for the displacement of the inner housing with respect to the outer housing caused by the tilting of the camera.

It should be noted that the instant invention is not limited solely to the utilization of a single position compensation mechanism 50. Thus, for example, a second position compensation mechanism can be provided intermediate another portion of inner camera housing 8 and outer camera housing 1 for adjusting the position of inner housing 8 when the movie camera is tilted in another direction. Also, the instant invention is not limited to the embodiment where the lever is rotatably connected to the inner housing and fixedly coupled with the outer housing; the arrangement can be reversed so that the lever is rotatably coupled to the outer housing 1 and fixedly coupled to inner housing 8.

Referring now to FIG. 5, an alternative embodiment of a position compensation mechanism according to the present invention, which utilizes a conventional electrical control circuit, is depicted. The position compensation mechanism depicted in FIG. 5 includes a proximity position sensor 36, which includes a sensor 36a on inner camera 7 and a sensor 36b on outer housing 1, adapted to deliver signals representative of the change in position between inner housing 8 and outer housing 1. These signals are received, for example, by a dynamic signal processing circuit having a control stage which is adapted to drive a motor in response to the position signals. The processing circuit is coupled to a servomotor 37 which is supported on inner housing 8 by an intermediate layer of elastic material 39 which provides the proper damping. The output signal of the processing circuit drives motor 37 which, in turn, will cause a spindle 38 to move. Spindle 38 is coupled to outer camera housing 2 thereby providing adjustment of the position between inner camera housing 8 and outer camera housing 1. The movement of spindle 38 takes place so that the initial position of the position sensor 36 and, thus, of the inner camera relative to the outer camera is maintained.

In an alternative embodiment, spindle 38 can act on the free end of lever 22 (FIG. 3) or lever 60 (FIG. 4) of position compensation mechanism 50 so that weight 23 can be eliminated.

The present invention is not limited to an arrangement of one or two armed levers arranged in a vertical plane of the motion picture camera. The levers can be arranged in any desired position within the outer camera housing for adjusting the position of the inner camera housing with respect thereto. Accordingly, the instant invention is particularly characterized by the use of a position compensation mechanism that will adjust the position of the inner housing with respect to the outer housing so that optimum focusing at the camera will be maintained when the movie camera is displaced.

It will thus be seen that the objects set forth above, among those made apparent from the preceding description, are efficiently attained and, since certain changes may be made in the above construction without departing from the spirit and scope of the invention, it is intended that all matter contained in the above description of whoen in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A movie camera comprising an outer housing and an inner housing disposed within said outer housing, said inner housing having a predetermined orientation with respect to said outer housing when said outer housing is in a normally operative position, film gate means supported on said inner housing, said outer housing including photographic optic mounting means for supporting photographic optics, mounting means for mounting and orienting said inner housing with respect to said outer housing when said outer housing is in said first normally operative position, and position compensation means operatively coupled to said inner housing and said outer housing for maintaining the orientation of said inner housing with respect to said outer housing when said outer housing is displaced from said first normally operative position.

2. A movie camera as claimed in claim 1, wherein said film gate means and said photographic optic means define a first focused position when said outer housing is in said normally operative position, said position compensation means being adapted to maintain said first focused position when said outer housing is displaced from said normally operative position.

3. A movie camera as claimed in claim 2, wherein said position compensation means includes counterbalance means coupled intermediate said inner housing and said outer housing for maintaining the orientation of said inner housing at said first focused position upon displacement of said outer housing from said normally operative position.

4. A movie camera as claimed in claim 3, wherein said counterbalance means includes lever means and means for coupling said lever means to said inner housing and said outer housing so that said lever means maintains the orientation of said inner housing at said first focused position upon displacement of said outer housing from said normally operative position.

5. A movie camera, as claimed in claim 4, wherein said coupling means includes a shaft having two ends, a first end of said shaft being mounted to said inner housing, the second end of said shaft being coupled to a first end of said lever means, said lever means being coupled to said outer housing so that the orientation of said inner housing with respect to said outer housing is maintained at said first focused position upon displacement of said outer housing from said normally operative position.

6. A movie camera as claimed in claim 5, wherein said second end of said shaft is rotatably coupled to said first end of said lever means, said coupling means including means for pivotably coupling said lever means to said outer housing so that when said outer housing is displaced from said normally operative position, said lever means will pivot so that the orientation of said inner housing with respect to said outer housing is maintained in said first focused position.

7. A movie camera, as claimed in claim 6, wherein said coupling means includes a rod having two ends, a first end of said rod being rotatably coupled to said outer housing, said second end of said rod being fork-shaped, said lever means being pivotally coupled in said fork-shaped end of said rod.

8. A movie camera, as claimed in claim 4, wherein said coupling means includes a shaft having two ends, a first end of said shaft being coupled to said inner housing, said second end of said shaft being coupled to said lever means, and means for rotatably coupling said shaft to said outer housing, said first end of said shaft being adapted to maintain the orientation of said inner housing with respect to said outer housing upon displacement of said outer housing from said first normally operative position.

9. A movie camera as claimed in claim 8, wherein said first end of said shaft includes eccentric disc means, said inner housing including means for rotatably receiving said eccentric disc means so that when said outer housing is displaced, said lever means will cause said eccentric disc means to cooperate with said receiving means so that the orientation of said inner housing with respect to said outer housing is maintained.

10. A movie camera as claimed in claims 4, 7 or 9, wherein said coupling means includes resilient means, said resilient means being adapted to dampen sound from said inner housing to said outer housing.

11. A movie camera, as claimed in claim 10, wherein said coupling means includes spacer means for allowing the proper coupling of said position compensation means to said inner and outer housings.

12. A movie camera as claimed in claim 10, wherein said lever means includes weight means for moving said lever means with respect to said outer housing in response to displacement of said outer housing.

13. A movie camera as claimed in claim 2, wherein said position compensation means includes position sensing means for sensing the change in position of said inner housing with respect to said outer housing and for producing a position signal representative of said change in position, and drive means coupled intermediate said inner and outer housings for receiving said position signal and in response thereto maintaining said inner housing in said first focused position.

14. A movie camera as claimed in claim 13, wherein said drive means includes motor means for maintaining said inner housing in said first focused position upon displacement of said outer housing from said normally operative position in response to said position signal.

15. A movie camera as claimed in claim 14, wherein said drive means includes spindle means, said motor means being adapted to drive said spindle means in response to the activation of said drive means by said position signal, said spindle means being coupled intermediate said inner housing and said outer housing so that said inner housing is maintained in said first focused position when said motor means drives said spindle means.

16. A movie camera as claimed in claim 11, wherein said position compensation means includes position sensing means for sensing the change in position of said inner housing relative to said outer housing and for producing a position signal representative of said change in position, drive means for receiving said position signal and in response thereto producing a driving signal, motor means adapted to be activated by said driving signal, and spindle means coupled to said lever means and said motor means so that upon activation of said motor means said spindle means will displace said lever means whereby said inner housing will be maintained in said first focused position.

17. A movie camera as claimed in claim 15, wherein said motor means includes resilient mounting means for mounting said motor means to said inner housing so that said outer housing is damped with respect to said inner housing.

18. A movie camera as claimed in claim 16, wherein said motor means includes resilient mounting means for mounting said motor means to said inner housing so that said outer housing is damped with respect to said inner housing.

* * * * *